(12) United States Patent
Boyd et al.

(10) Patent No.: US 8,196,148 B2
(45) Date of Patent: Jun. 5, 2012

(54) NOTIFICATION OF CHANGED PARAMETERS IN A PRINTING SYSTEM

(75) Inventors: Erin A. Boyd, Longmont, CO (US); Samuel N. Hopper, Boulder, CO (US); Kent S. Norgren, Louisville, CO (US); Stephen G. Price, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 1690 days.

(21) Appl. No.: 11/262,395

(22) Filed: Oct. 28, 2005

(65) Prior Publication Data

US 2007/0097399 A1 May 3, 2007

(51) Int. Cl.
*G06F 3/00* (2006.01)
*G06F 13/00* (2006.01)
*G06K 15/00* (2006.01)

(52) U.S. Cl. ....... 719/313; 358/1.16; 358/1.1; 358/1.15; 358/1.9

(58) Field of Classification Search ........ 358/1.11–1.18; 717/168–178; 709/200, 221
See application file for complete search history.

(56) References Cited

U.S. PATENT DOCUMENTS

| 5,664,180 | A | 9/1997 | Halpert et al. |
| 6,363,255 | B1 | 3/2002 | Kuwahara |
| 6,373,817 | B1 | 4/2002 | Kung et al. |
| 6,826,173 | B1 | 11/2004 | Kung et al. |
| 2001/0022659 | A1* | 9/2001 | Arai ............................. 358/1.2 |
| 2004/0199865 | A1* | 10/2004 | Bie et al. ...................... 715/500 |
| 2004/0207868 | A1* | 10/2004 | Lay et al. ..................... 358/1.15 |
| 2005/0068558 | A1* | 3/2005 | Wang et al. .................. 358/1.13 |
| 2005/0177651 | A1* | 8/2005 | Clark .............................. 710/8 |

* cited by examiner

Primary Examiner — Twyler Haskins
Assistant Examiner — Chad Dickerson
(74) Attorney, Agent, or Firm — Duft Bornsen & Fishman, LLP (57) ABSTRACT

A print controller, methods, and software are disclosed. A print controller of the invention includes applications, a parameter manager, and a notification system. The applications register with parameter manager those parameters for which they want to be notified when a change occurs. As part of the registration, the applications designate a callback identifier (CID) for each of the parameters, where an individual CID may be associated with a single parameter or a plurality of related parameters. Responsive to receiving an indication of changes to one or more of the parameters, the notification system identifies the applications registered to be notified of changes to the parameters, and identifies the CIDs associated with the parameters that have changed. The notification system then transmits one or more notification messages, including the identified CIDs for the changed parameters, to each application that is registered.

20 Claims, 4 Drawing Sheets

NOTIFICATION OF CHANGED PARAMETERS IN A PRINTING SYSTEM

BACKGROUND OF THE INVENTION

1. Field of the Invention

The invention relates to the field of printing systems and, in particular, to print controllers having an improved manner of notifying applications of changes to parameters of the printing system.

2. Statement of the Problem

Printing systems associated with data processing enterprises generally include a localized print controller within the printing system. The print controller controls overall operation of the printing system including, for example, host interfacing, page description language interpretation, rasterising, and lower level process control or interface features of the print engine associated with the printing system. Host interaction may include appropriate adapters for coupling the printing system to host systems utilizing one or more communication media and one or more communication protocols. Raw print jobs are received by the printing system from the attached host systems. The raw print jobs are generally encoded in the form of a page description language, such as PostScript, Hewlett-Packard PCL, Intelligent Printer Data Stream (IPDS), etc. In addition, raw print jobs may be encoded as simple character streams (ASCII) with no page description formatting associated therewith. In whatever form the raw print job may be encoded or formatted, the print controller within the printing system interprets the received information to generate rasterized images of pages represented by the raw print job. Each rasterized page image generally comprises a 2-dimensional array of picture elements ("pixels") that represent a corresponding formatted page of the raw print job. Each pixel may represent an encoded color value in accordance with the requirements of the particular raw print job encoding and the capabilities of the printing system on which the print job is to be printed. The process of interpreting the raw print job to generate corresponding rasterized page images is typically referred to as "ripping" and the sequences of rasterized pages may be referred to as a "ripped print job" or "rasterized print job".

The print controller may store or buffer one or more ripped print jobs in accordance with storage capabilities of the particular architecture of a particular print controller. Each ripped print job comprises one or more rasterized images, each referred to as a "logical page" of the ripped print job. The print controller may then apply the logical pages to a print engine (sometimes also referred to as an "imaging engine" or as a "marking engine"). The print engine then interacts with the imaging process to mark the printable medium (e.g., the sheet of paper) with the logical pages provided by the print controller. For example, where the print engine is an electrophotographic imaging engine (e.g., a laser print engine), a laser or other optical imaging system transfers each logical page rasterized image through photosensitive materials to corresponding pixels on paper formed as particles of toner electrostatically transferred to the paper.

Printing systems have a plurality of parameters that are used by the print controller and other embedded devices. For instance, parameters of a printing system may be paper length, paper width, paper weight, etc. One or more of the parameters may change during operation. Print controllers, and other systems associated with a printing system, include multiple applications (also known as processes or tasks) that are running. These applications operate using the parameters. When a change is made to one or more of the parameters, the applications may need to be notified of the parameter change.

One way to notify the applications of parameter changes is to have each application register for the parameters that it needs to be notified of as the values change. When a parameter does change, a component in the print controller that handles the parameters sends messages to the applications that have registered for that parameter.

Multiple related parameters in a printing system may change simultaneously. For instance, in a laser printer, paper size is specified with a length and width. A new paper size is set up by entering a length and width simultaneously. In a traditional print controller, a change to two related parameters such as this requires sending multiple notification messages to the applications registered for these parameters. One notification message is sent for paper length, and one notification message is sent for paper width. Responsive to receiving a notification messages, an application may need to reprocess previously processed data based on the new parameter values. It is a problem in the art to send multiple notification messages when multiple related parameters are changed due to the inefficiency of the process.

Parameters of the printing system may be strings, integers, or structures. Structures are comprised of a plurality of fields of various data types. When a parameter is a structure, change notification to the applications is done on the basis of the structure as a whole. Regardless of whether a single bit is changed or many whole fields are changed, a notification message is sent out to the registered applications indicating the new structure as a whole. The notification message does not identify which bits or which fields have changed within the structure.

The application receiving the new structure may assume that each field in the structure has changed, and the application may have to reprocess previously processed data for each of the fields. Unfortunately, this is a waste of processing time. Alternatively, the application receiving the new structure may need to store an old copy of the structure, and compare the old copy to the new copy to determine the changed values. This alternative requires that each application store an old copy of the structure which increases memory usage. This alternative also requires that each application includes code to do the comparison and identify the changed fields, further increasing memory usage and processing time.

It may be desirable to have a more efficient and effective manner of notifying applications to changes to parameters of a printing system.

SUMMARY OF THE SOLUTION

The present invention solves the above and other related problems by designating a common callback identifier for related parameters of a printing system. The applications registering for notification of parameter changes are adapted to designate callback identifiers for the parameters. The application can thus group related parameters together by designating a common callback identifier for the related parameters. When changes are made to the parameters, the callback identifier is identified for each of the changed parameters. If some or all of the changed parameters are related as designated by the application, then a common callback identifier is identified for the related parameters. Only a single notification message needs to be sent to the application for the related parameters based on the common callback identifier. This advantageously reduces the number of notification messages that need to be provided to a registered application.

It also advantageously avoids the application having to reprocess previously processed data for a changed parameter, and then subsequently reprocess the data again for another related changed parameter. As an example, a rasterizer application may need to re-rip a print job responsive to the paper size being changed. If the rasterizer application determines that paper width changed, then it may re-rip the print job based on the new paper width. If the rasterizer application subsequently determines that paper length changed, then it may re-rip the print job based on the new paper length. The application, responsive to a notification message, is assured that all related parameters are indicated in the notification message using the common callback identifier.

Further, if the parameter is a structure, an application may designate a callback identifier for one or more related fields of the structure. Responsive to receiving a notification message from the notification system, the application can identify which field or fields have been changed based on the callback identifier. The application does not have to store an old copy of the structure to identify the changes to the fields. The application also does not need to reprocess based on a whole new structure, as only the changed fields need to be reprocessed.

In one embodiment of the invention, a print controller includes a plurality of applications, a parameter manager, and a notification system. The applications first register parameters with the parameter manager. To register parameters, an application identifies the one or more parameters of the printing system with which to register. The application registers the parameters for which it wants to be notified when there is a change to one or more of the parameters. The application also designates a callback identifier (CID) for each parameter. A CID may be associated with a single parameter or may be associated with a plurality of related parameters. The application generates a registration request that indicates the parameters and their associated CIDs, and transmits the registration request to the parameter manager.

The parameter manager receives the registration requests from applications. The registration request from an individual application indicates one or more parameters for which the application is to be notified when there is a change to one or more of the parameters. The registration request from an individual application also indicates a CID for each of the parameters. An individual CID may be associated with a single parameter or a plurality of related parameters. Responsive to receiving the registration requests, the parameter manager processes the registration requests to generate a registration data structure that includes the parameter and CID information registered by each application.

Responsive to receiving an indication of changes to one or more of the parameters of printing system, the notification system identifies the applications registered to be notified of changes to the parameters based on the registration data structure. For each identified application, the notification system identifies the CIDs associated with the parameters that have changed. The CIDs were previously designated by the applications. The notification system then transmits one or more notification messages to each application that is registered. The notification messages indicate the identified CIDs for the changed parameters. A CID in the notification message indicates a change to a single parameter or a change to one or more related parameters.

The invention may include other exemplary embodiments described below.

DESCRIPTION OF THE DRAWINGS

The same reference number represents the same element on all drawings.

DETAILED DESCRIPTION OF THE INVENTION

FIGS. 1-6 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
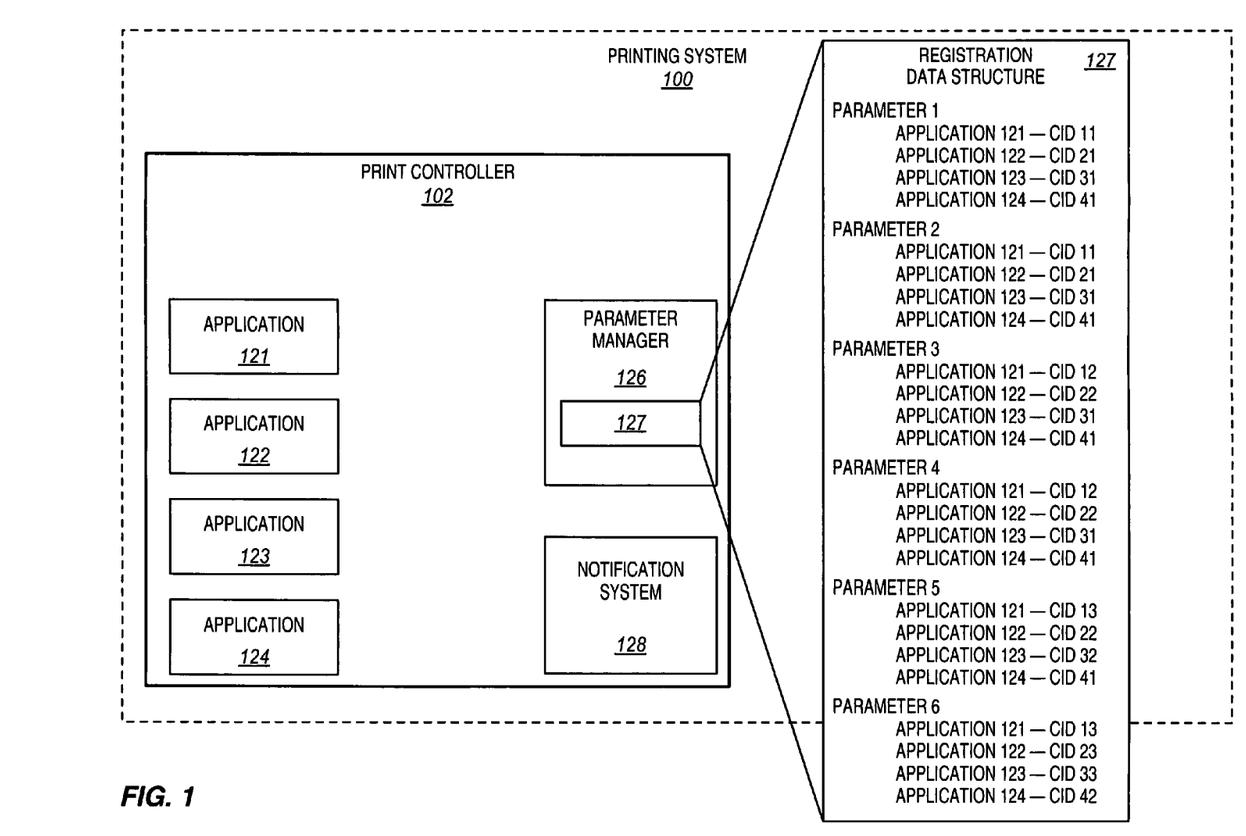
FIG. 1 illustrates a printing system in an exemplary embodiment of the invention.

FIG. 1 illustrates a printing system 100 in an exemplary embodiment of the invention. Printing system 100 comprises any system used to provide marks on a media, such as a continuous forms printer or a cut sheet page printer. In FIG. 1, printing system 100 is shown as including a print controller 102. Printing system 100 may include many other components not shown for the sake of brevity, such as a print engine, a user interface, host interfaces, etc.

Print controller 102 includes a plurality of applications 121-124, a parameter manager 126, and a notification system 128. An application comprises any process or task configured to perform a function related to the operation of printing system 100. An application may be implemented as software, as hardware, or as a combination of software and hardware. In a software implementation, an application may run on one or more processors (not shown) in print controller 102. Although applications 121-124 are illustrated as applications running on print controller 102, other applications may be running outside of print controller 102, such as on host systems or peripheral devices.

Parameter manager 126 comprises any process, application, or system configured to monitor or handle parameters related to printing system 100. For instance, parameter manager 126 may maintain a data structure 127 indicating the parameters for printing system 100, and indicating the applications registered to be notified of changes to the parameters. Parameter manager 126 may also maintain a list of the current states or values of the parameters.

Notification system 128 comprises any process, application, or system configured to notify one or more applications of a change to one or more parameters. Notification system 128 may notify the applications using any desired messaging or communication protocol.

Each application 121-124 registers with parameter manager 126. To register, each application 121-124 identifies a set of parameters of printing system 100 for which application 121-124 wants or needs to be notified when there is a change to one or more of the set of parameters. Applications 121-124 may register one or more parameters at startup and/or during operation. Applications 121-124 may also de-register one or more parameters as desired.

Figure 2:
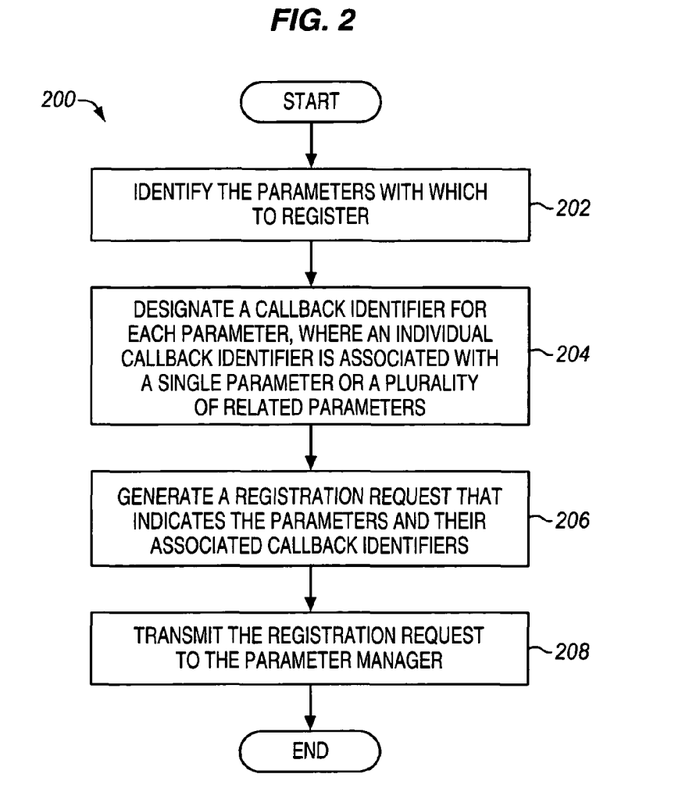
FIG. 2 is a flow chart illustrating a method of operating an application to register for parameter change notification in an exemplary embodiment of the invention.

FIG. 2 is a flow chart illustrating a method 200 of operating an application to register for parameter change notification in an exemplary embodiment of the invention. Method 200 may be performed by applications 121-124 (see FIG. 1) or other applications not shown in FIG. 1. Method 200 may not be all inclusive and there may be steps to method 200 that are not shown in FIG. 2.

In step 202, an application, such as any of applications 121-124, identifies the parameters with which to register. The application registers the parameters for which it wants to be notified when there is a change to one or more of the parameters. The parameters registered by the application may be subset of all the parameters of printing system 100 depending on the parameter usage of the application. Different applications may register different parameters as they operate using different parameters.

In step 204, the application designates a callback identifier (CID) for each parameter. A callback identifier (CID) comprises any name, number, string, code, or other indicator designated by the application. Traditionally, a parameter is identified by a unique name (e.g., paper_width or paper_length) and a unique number. The applications, according to the invention, also designate a CID for each parameter. A CID may be associated with a single parameter, or may be associated with a plurality of related parameters. Related parameters are a plurality of parameters designated by an application as having some relationship such that the application wishes to be notified of changes to the parameters at substantially the same time. For instance, paper width and paper length generally have a relationship in printing systems such that an application may wish to be notified of changes to paper width and paper length at the same time.

In step 206, the application generates a registration request that indicates the parameters and their associated CIDs. The application then transmits the registration request to parameter manager 126 in step 208. The registration request may be a single request that identifies all parameter/CID combinations or may be multiple requests each identifying a parameter/CID combination.

Method 200 may be performed upon startup of an application and/or at any time during execution of the application. For instance, if an application comes to a state where more parameters are being used by the application, the application can register more parameters by sending another registration request. If an application comes to a state where fewer parameters are being used by the application, the application can de-register unneeded parameters by sending an appropriate de-registration request.

Figure 3:
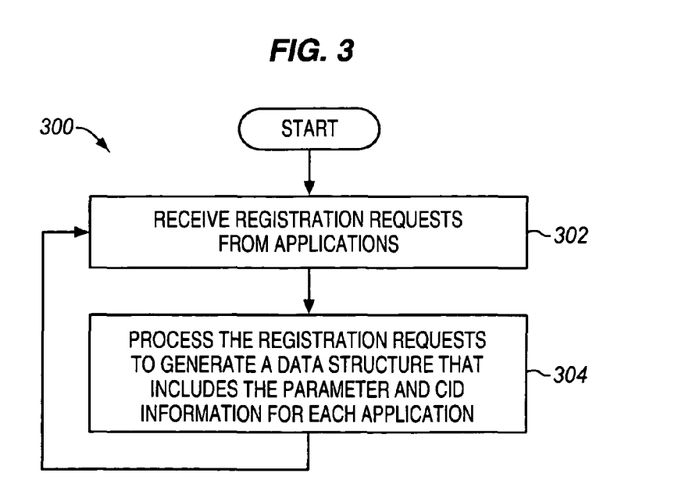
FIG. 3 is a flow chart illustrating a method of operating a parameter manager in an exemplary embodiment of the invention.

FIG. 3 is a flow chart illustrating a method 300 of operating parameter manager 126 in an exemplary embodiment of the invention. Method 300 may not be all inclusive and there may be steps to method 300 that are not shown in FIG. 3. In step 302, parameter manager 126 receives the registration requests from applications, such as applications 121-124. As described in FIG. 2, the registration request from an individual application indicates one or more parameters for which the application is to be notified when there is a change to one or more of the parameters. The registration request from an individual application also indicates a CID for each of the parameters. An individual CID may be associated with a single parameter or a plurality of related parameters.

Responsive to receiving the registration requests, parameter manager 126 processes the registration requests in step 304 to generate a registration data structure that includes the parameter and CID information registered by each application. Parameter manager 126 continually updates the registration data structure responsive to receiving registration requests from the applications.

FIG. 1 illustrates an exemplary registration data structure 127 as generated by parameter manager 126. Registration data structure 127 may have any desired form in other embodiments. In this embodiment, registration data structure 127 lists parameters 1-6 for illustrative purposes. For parameter 1, each of applications 121-124 have registered for parameter 1, meaning that applications 121-124 want to be notified of a change to parameter 1. Application 121 has designated CID 11 for parameter 1, application 122 has designated CID 21 for parameter 1, application 123 has designated CID 31 for parameter 1, and application 124 has designated CID 41 for parameter 1.

Each of applications 121-124 has also registered for parameter 2, meaning that applications 121-124 want to be notified of a change to parameter 2. Application 121 has designated CID 11 for parameter 2, application 122 has designated CID 21 for parameter 2, application 123 has designated CID 31 for parameter 2, and application 124 has designated CID 41 for parameter 2. Each application 121-124 has designated the same CID for parameter 2 as they did for parameter 1, meaning that each application 121-124 has determined that parameter 1 and parameter 2 are related and thus are given the same CID.

Each of applications 121-124 has also registered for parameter 3. Application 121 has designated CID 12 for parameter 3, application 122 has designated CID 22 for parameter 3, application 123 has designated CID 31 for parameter 3, and application 124 has designated CID 41 for parameter 3. Applications 123-124 have designated the same CID for parameter 3 as they did for parameters 1 and 2, meaning that applications 123-124 have determined that parameters 1, 2, and 3 are related. Application 121 has designated a different CID "12" for parameter 3, meaning that parameter 3 is not related to parameters 1 and 2. Similarly, application 122 has designated a different CID "22" for parameter 3, meaning that parameter 3 is not related to parameters 1 and 2.

Applications 121-124 also registered for parameters 4-6 as is illustrated in FIG. 1.

Parameter manager 126 may also maintain a master parameter data structure (not shown) that includes all of the parameters of printing system 100 and includes updated information on the values or states of the parameters. For instance, if the paper size in tray 1 of printing system 100 is currently 8 ½×11 inches, then the master parameter data structure may have an entry for the parameter "paper_width" that has a value of 8½ inches. The master parameter data structure may also have an entry for the parameter "paper_length" that has a value of 11 inches.

Figure 4:
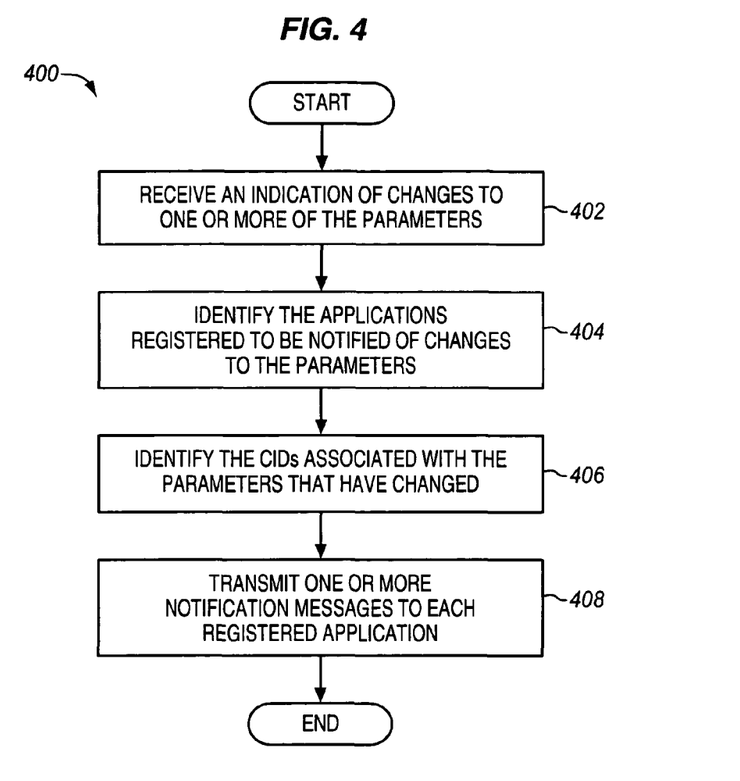
FIG. 4 is a flow chart illustrating a method of operating a notification system in an exemplary embodiment of the invention.

FIG. 4 is a flow chart illustrating a method 400 of operating notification system 128 in an exemplary embodiment of the invention. Method 400 may not be all inclusive and there may be steps to method 400 that are not shown in FIG. 4. In step 402, notification system 128 receives an indication of changes to one or more of the parameters of printing system 100. The application providing the change may send a change indication message to notification system 128. For instance, assume that application 121 in FIG. 1 is an application for a user interface of printing system 100. If a user of printing system 100 changes one or more parameters through application 121, then application 121 may send a change indication message to notification system 128.

In step 404, notification system 128 identifies the applications registered to be notified of changes to the parameters based on the registration data structure 127. Notification system 128 communicates with parameter manager 126 to identify the applications registered to be notified of changes to the parameters. As an example, notification system 128 may request access to the registration data structure 127, and then parse the registration data structure 127 for each changed parameter. Notification system 128 may then identify those applications registered for the changed parameters.

For each identified application in step 404, notification system 128 identifies the CIDs associated with the parameters that have changed in step 406. The CIDs were previously designated by the applications (see FIG. 2). As an example, notification system 128 may parse the registration data structure 127 for each application to identify the CIDs for the changed parameters.

In step 408, notification system 128 transmits one or more notification messages to each application that is registered. The notification messages indicate the identified CIDs for the changed parameters. Notification system 128 may transmit a single message having a plurality of CIDs, or may transmit a separate message for each CID.

Responsive to receiving a notification message, an application, such as application 121, processes the CID(s) received in the notification message. The application is able to identify the changed parameters based on the received CID(s), as a CID indicates a change to a single parameter or indicates a change to one or more related parameters. The application may then request new values for the parameters, such as by communicating with parameter manager 126 that has a master parameter data structure of all the current parameter values. Responsive to receiving the new parameter values, the application may then reprocess previously processed data using the new parameter values.

The change notification described above provides advantages over prior printing systems. For one, applications are able to group related parameters together in a common CID when they register. When related parameters are changed, notification system 128 only needs to send a single notification message to an application identifying the common CID for the related parameters. This advantageously reduces the number of notification messages that need to be provided to the applications. It also advantageously avoids the application having to reprocess previously processed data for a changed parameter, and then subsequently reprocess for another related changed parameter. The application, responsive to a notification message, is assured that all related parameters are indicated in the notification message using the common CID.

Figure 5:
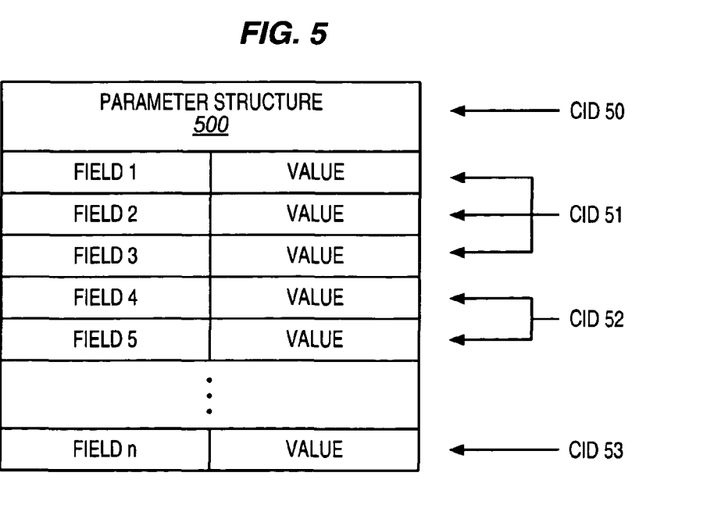
FIG. 5 illustrates a parameter structure in an exemplary embodiment of the invention.

In some embodiments, a parameter may comprise a structure instead of merely an integer or string. FIG. 5 illustrates a parameter structure 500 in an exemplary embodiment of the invention. Parameter structure 500 includes a plurality of fields 1-n each having a value. As discussed in FIG. 2, applications designate CIDs for each parameter for which they want to be notified of a change. In a similar fashion, applications may designate a CID for each field of a parameter so that the application may be notified of a change to one or more fields of a parameter. If one or more fields of the parameter are related, the application may designate a common CD for the related fields.

In FIG. 5, exemplary CIDs for one or more applications are shown for the fields 1-n of parameter structure 500 as designated by an application. CID 50 has been designated for parameter structure 500 as a whole. Fields 1-3 of parameter structure 500 are related and a common CID 51 has been designated for those fields. Fields 4-5 are related and a common CID 52 has been designated for those fields. Field n has been designated with CID 53.

When a parameter is a structure as in FIG. 5, notification of changes is provided substantially as provided above in FIGS. 2-4 except that notification is provided on the field level as well as on the parameter (entire structure) level. When an application registers on a field, it is notified when that field changes but not notified when other fields change. In addition, if an application registers on the entire structure, it is notified when any one or more of the fields change. In the case of registering on the entire structure, if multiple fields are changed in a single operation, the application gets a single notification. Applications can thus identify changes to fields of a parameter more effectively.

EXAMPLE

Figure 6:
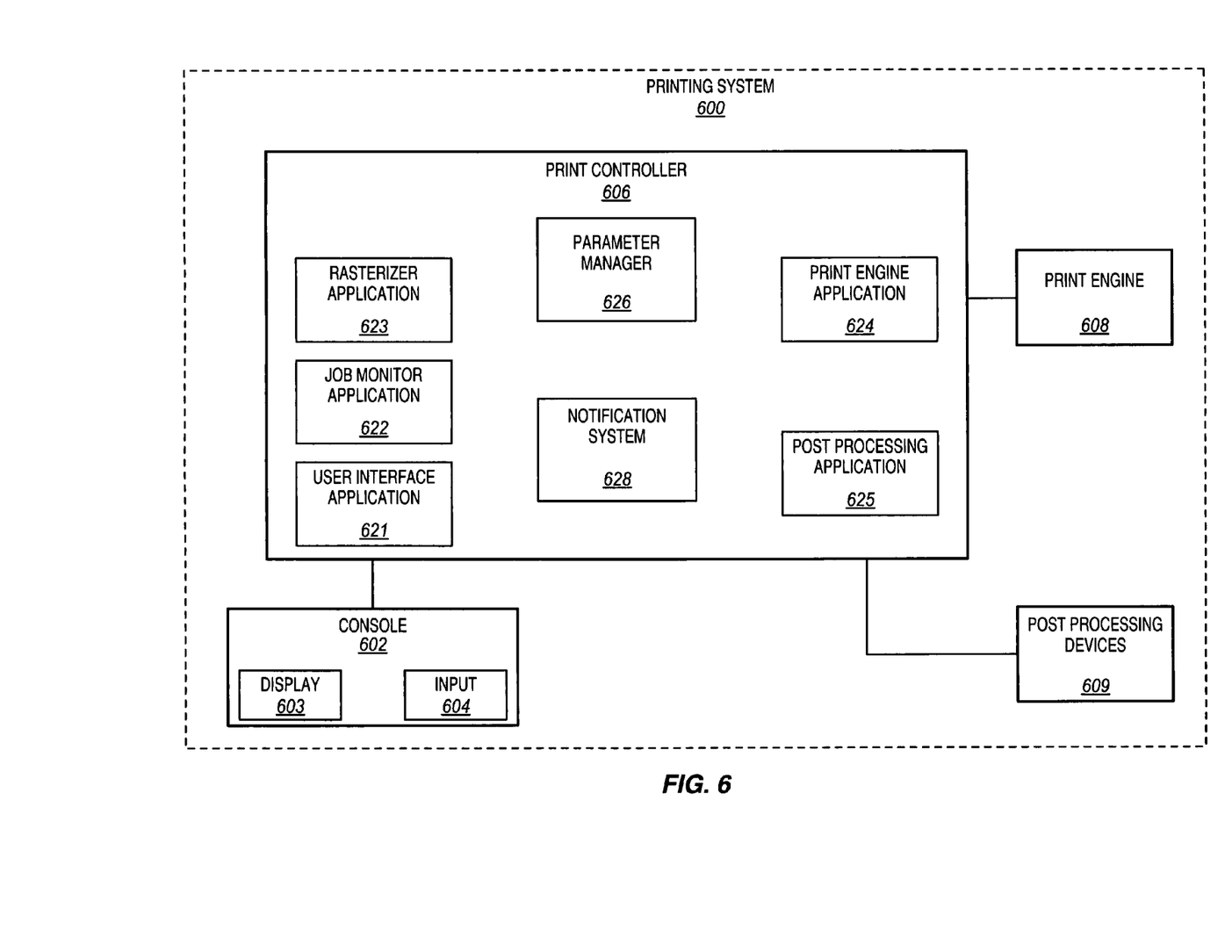
FIG. 6 illustrates a printing system in another exemplary embodiment of the invention.

FIG. 6 illustrates a printing system 600 in another exemplary embodiment of the invention. Assume for this embodiment that printing system 600 comprises a continuous forms printer. Printing system 600 includes a console 602 having a display 603 and an input device 604, such as a keypad, touch screen, pointing device, etc. Printing system 600 also includes a print controller 606, a print engine 608, and post processing devices 609.

Print controller 606 includes a plurality of applications. The applications include a user interface application 621, a job monitor application 622, a rasterizer application 623, a print engine application 624, and a post processing application 625. FIG. 6 illustrates one example of applications running on a print controller 606, but the invention is not limited to these applications. Applications 621-625 are stored in a memory (not shown) and are executable by a processing system (not shown), which is understood by those skilled in the art. Print controller 606 also includes a parameter manager 626 and a notification system 628, which may comprise other applications or separate components.

To provide parameter change notification to applications 621-625, the applications first register with parameter manager 626. For illustrative purposes, user interface application 621 identifies the parameters with which to register. User interface application 621 registers the parameters for which it wants to be notified when there is a change to one or more of the parameters. As an example, assume that user interface application provides a screen image to console 602 showing the paper type currently loaded on the printing system 600. Some of the parameters that user interface application 621 may register for are paper width, paper length, paper weight, etc.

User interface application 621 also designates a CID for each parameter it is registering. If two or more parameters are related, then user interface application 621 may designate a common CID for the related parameters. User interface application 621 may generate a registration request that indicates the parameters and their associated CIDs, and transmit the registration request to parameter manager 626. User interface application 621 may alternatively make a function call to register the parameters.

If a parameter is in the form of a structure, then user interface application 621 designates a CID for each field of the structure. If two or more fields of a parameter are related, then user interface application 621 may designate a common CID for the related fields. Several approaches are possible for registration of structure parameters.

First, a new message or function call is used for structure/field registration. The structure name and field name are arguments in the message/function call. Alternatively, arguments in the function call may be a number for the parameter.

Second, a common message/function call is used for scalar (non-data structure) parameters, structure parameters, and fields. The message/function call has one argument for the parameter name/number and one argument for the field name/number. The field name/number is optional and is not used when a non-structure parameter is named. For structure parameters, if the field argument is null or omitted, then the registration applies to the structure parameter as a whole. If the field argument is provided, then the registration is for changes to only that field.

Third, a common message/function call is used for all registrations. There is an argument for parameter name/number and no argument for a field name/number. Registrations for scalar parameters and structures as a whole provide just a parameter name. Registrations for fields of a structure provide the registration name as a compound name with some designated syntax, such as a period, colon, or underscore separating the parameter name and the field name. For instance, for a data structure called "margin" with fields called "top", "bottom", "left", and "right", the names used to access the fields may be margin:top, margin:bottom, margin:left, and margin:right. Alternatively, the names used to access the fields may be margin_top, margin_bottom, margin_left, and margin_right. Alternatively, the data structure "margin" may be assigned the number 10000 and the fields "top", "bottom", "left", and "right" may be assigned the numbers 10001, 10002, 10003, and 10004, respectively.

Each application 622-625 operates similarly to register parameters/fields and CIDs with parameter manager 626. Parameter manager 626 then builds a registration data structure or registration list of parameters/CIDs for the applications.

Assume that a user changes one or more parameters through console 602. User interface application 621 receives the changes to the parameters. User interface application 621 then calls a parameter set function. The parameter IDs and the new values are passed as arguments in the parameter set function. The parameter set function may be implemented as a library function. The code for the parameter set function runs on a thread of the calling application in the address space of the calling application, which is user interface application 621 in this example. When the parameter set function specifies multiple new values, a list is made of the changed parameters.

The parameter set function then transmits a message to notification system 628 that includes the list of changed parameters. Receiving the list of changed parameters is an indication that one or more parameters have changed. Notification system 628 processes the list of changed parameters and processes the registration data structure from parameter manager 626 to build a list of all the applications that are registered for one or more of the changed parameters (referred to herein as the application list). Notification system 628 only adds the registered applications to the application list once, so there are no duplicates in the application list.

Notification system 628 creates an empty list of CIDs for each application in the application list. Notification system 628 then parses the list of changed parameters. For each changed parameter in the list, notification system 628 parses the registration data structure to identify the applications registered for that parameter. Notification system 628 also identifies the CID designated by that application for the parameter. If the CID is not already entered in the application list, then notification system 628 adds the CID to the application list for that application. If the CID is already entered in the application list, then notification system 628 does not need to add the CID.

Notification system 628 continues this process for each of the changed parameters to build the CID list for each application in the application list. When notification system 628 has finished this process, a minimal list of CIDs is recorded for each application in the application list. The application list includes only one instance of an individual CID for each application. Notification system 628 then transmits notification messages to the applications 621-625. Notification system 628 may send one notification message to each application 621-625 that includes a plurality of CIDs for the changed parameters. Alternatively, notification system 628 may send multiple notification messages to each application 621-625 where each notification message includes a single CID for a changed parameter.

Notification system 628 operates substantially the same if one of the changed parameters is a structure. If one of the changed parameters is a field of a structure parameter, then notification system 628 sends notification messages for the field and for the structure as a whole. If one of the changed parameters is a structure as a whole, then the new and old values are compared on a field-by-field basis for all fields in the structure. For each field that is changed, notification system 628 sends a notification message to the applications.

The processes, code, or instructions that make up the notification system 628 and/or parameter manager 626 may be implemented in many desired arrangements. For instance, notification system 628 may be implemented as two processes, such as a change consolidation process and a change propagation process. In one embodiment, the change consolidation process, which creates the application list, may run on the thread of the application that called the parameter set function. The change consolidation process then transmits the application list to the change propagation process using an inter-process message. The application list includes the list of CIDs for each registered application. The change propagation process then transmits the notification messages to the applications based on the application list.

In another embodiment, notification system 628 is implemented as a change consolidation process that runs on the thread of the application that called the parameter set function. The change consolidation process then sends out the notification messages to the applications.

In another embodiment, a parameter is set by sending a message to a parameter set process instead of a function call. The parameter set process updates the values and sends out the notification messages to the applications.

In another embodiment, a parameter is set by sending a message to a parameter set process instead of a function call. The parameter set process updates the values and transmits an application list to a change propagation process using an inter-process message. The change propagation process then transmits the notification messages to the applications based on the application list.

The invention can take the form of an entirely hardware embodiment, an entirely software embodiment, or an embodiment containing both hardware and software elements. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-RW) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Although specific embodiments were described herein, the scope of the invention is not limited to those specific embodiments. The scope of the invention is defined by the following claims and any equivalents thereof.

We claim:

1. A print controller implemented at a processor for a printing system, the print controller adapted to notify applications of changes to parameters of the printing system, the print controller comprising:
   a parameter manager adapted to process registration requests received from applications to generate a registration data structure,
   wherein a registration request from an individual application indicates multiple parameters for which the application is to be notified when there is a change to the parameters,
   wherein the registration request from the individual application further indicates a callback identifier (CID) for the parameters where an individual CID is associated with a plurality of related parameters; and
   a notification system adapted to receive an indication of changes to the related parameters of the printing system, and to identify the applications registered to be notified of changes to the related parameters based on the registration data structure;
   for each identified application, the notification system is further adapted to identify the CIDs associated with the parameters that have changed based on the registration data structure, and to transmit at least one notification message to the application using the identified CIDs to indicate a change to the related parameters.

2. The print controller of claim 1 wherein the print controller is implemented at a printer.

3. The print controller of claim 1 wherein the applications are each adapted to:
   identify parameters for which the application is to be notified when there is a change to the parameters;
   designate a CID for each of the parameters where an individual CID is associated with a plurality of related parameters;
   generate a registration request that includes the identified parameters and the associated CIDs; and
   transmit the registration request to the parameter manager.

4. The print controller of claim 1 wherein:
   the notification system, responsive to receiving the indication of changes to the parameters, is adapted to identify the applications registered to be notified of changes to the parameters based on the registration data structure, to generate an application list from the identified applications, to identify the CIDs associated with the parameters that have changed based on the registration data structure, and to enter in the application list the CIDs associated with the parameters that have changed for each application.

5. The print controller of claim 4 wherein the application list includes only one instance of an individual CID for each application.

6. The print controller of claim 1 wherein:
   a parameter indicates a physical property of media loaded for printing at the printing system.

7. The print controller of claim 1 wherein the print controller is for a continuous forms printing system or a cut sheet page printing system.

8. A method of operating a printing system to notify applications of changes to parameters of the printing system, the method comprising:
   processing, via a processor, registration requests received from applications to generate a registration data structure,
   wherein the registration request from an individual application indicates multiple parameters for which the application is to be notified when there is a change to the parameters,
   wherein the registration request from an individual application further indicates a callback identifier (CID) for the parameters where an individual CID is associated with a plurality of related parameters;
   receiving an indication of changes to the related parameters of the printing system;
   identifying the applications registered to be notified of changes to the related parameters based on the registration data structure;
   identifying the CIDs associated with the parameters that have changed for each identified application based on the registration data structure; and
   transmitting at least one notification message to each of the applications using the identified CIDs to indicate a change to the related parameters.

9. The method of claim 8 wherein the processor is implemented at a printer.

10. The method of claim 8 further comprising:
    in each of the applications,
      identifying parameters for which the application is to be notified when there is a change to the parameters;
      designating a CID for each of the parameters where an individual CID is associated with a plurality of related parameters; and
      generating a registration request that includes the identified parameters and the associated CIDs.

11. The method of claim 8 wherein identifying the applications registered to be notified of changes to the parameters and identifying the CIDs associated with the parameters that have changed for each identified application comprises:

identifying the applications registered to be notified of changes to the parameters based on the registration data structure, generating an application list from the identified applications, identifying the CIDs associated with the parameters that have changed based on the registration data structure, and entering in the application list the CIDs associated with the parameters that have changed for each application.

12. The method of claim 11 wherein the application list includes only one instance of an individual CID for each application.

13. The method of claim 8 wherein:

a parameter indicates a physical property of media loaded for printing at the printing system.

14. The method of claim 8 wherein the printing system comprises at least one of a continuous forms printing system or a cut sheet page printing system.

15. A non-transitory computer readable medium embodying programmed instructions which, when executed by a processor, are operable for performing a method comprising:

instructions that when executed by a processing system are adapted to direct the processing system to process registration requests received from applications to generate a registration data structure, wherein the registration request from an individual application indicates multiple parameters for which the application is to be notified when there is a change to the of the parameters, wherein the registration request further indicates a callback identifier (CID) for each of the parameters where an individual CID is associated with a plurality of related parameters;

the instructions further adapted to direct the processing system to receive an indication of changes to the related parameters of the processing system, and to identify the applications registered to be notified of changes to the related parameters based on the registration data structure;

the instructions further adapted to direct the processing system to identify the CIDs associated with the parameters that have changed for each application based on the registration data structure, and to transmit at least one notification message to the applications using indicating the identified CIDs to indicate a change to the related parameters.

16. The medium of claim 15 wherein the processor is implemented at a printer.

17. The medium of claim 15 wherein the applications are adapted to direct the processing system to:

identify parameters for which the application is to be notified when there is a change to the parameters;

designate a CID for each of the parameters where an individual CID is associated with a a plurality of related parameters; and generate a registration request that includes the identified parameters and the associated CIDs.

18. The medium of claim 15 wherein the instructions, responsive to receiving an indication of changes to the parameters of the printing system, are adapted to direct the processing system to:

identify the applications registered to be notified of changes to the parameters based on the registration data structure;

generate an application list from the identified applications;

identify the CIDs associated with the parameters that have changed based on the registration data structure; and enter in the application list the CIDs associated with the parameters that have changed for each application, wherein the application list includes only one instance of an individual CID for each application.

19. The medium of claim 15 wherein:

a parameter indicates a physical property of media loaded for printing at the processing system.

20. The medium of claim 15 wherein the processing system comprises a continuous forms printing system or a cut sheet page printing system.

* * * * *

UNITED STATES PATENT AND TRADEMARK OFFICE
CERTIFICATE OF CORRECTION

| | | |
|---|---|---|
| PATENT NO. | : 8,196,148 B2 | |
| APPLICATION NO. | : 11/262395 | |
| DATED | : June 5, 2012 | |
| INVENTOR(S) | : Boyd et al. | |

It is certified that error appears in the above-identified patent and that said Letters Patent is hereby corrected as shown below:

In column 7, line 61, the text "a common CD" should read --a common CID--

In column 13, line 30, the text "when there is a change to the of the parameters," should read --when there is a change to the parameters,--

In column 14, lines 5-6, the text "the applications using indicating the identified CIDs" should read --the applications using the identified CIDs--

Signed and Sealed this
Fourteenth Day of August, 2012

David J. Kappos
*Director of the United States Patent and Trademark Office*